US007399412B2

(12) United States Patent
Keuschnigg

(10) Patent No.: US 7,399,412 B2
(45) Date of Patent: Jul. 15, 2008

(54) GUIDE MEANS FOR CENTRIFUGAL FORCE SEPARATORS, ESPECIALLY CYCLONE SEPARATORS

(75) Inventor: Josef Keuschnigg, Kirchberg (AT)

(73) Assignee: EJK Engineering GmbH, Gleisdorf (AT)

( * ) Notice: Subject to any disclaimer, the term of this patent is extended or adjusted under 35 U.S.C. 154(b) by 534 days.

(21) Appl. No.: 11/024,429

(22) Filed: Dec. 30, 2004

(65) Prior Publication Data

US 2005/0269258 A1 Dec. 8, 2005

(30) Foreign Application Priority Data

Dec. 30, 2003 (AT) ............................ A 2105/2003

(51) Int. Cl.
*B04C 5/103* (2006.01)
*B01D 45/12* (2006.01)
*B01D 21/26* (2006.01)
*B01D 17/038* (2006.01)

(52) U.S. Cl. .................. 210/512.1; 210/788; 55/459.1; 55/462; 96/208; 138/42; 138/44

(58) Field of Classification Search ............. 210/512.1, 210/788; 55/459.1, 462; 96/208; 138/38, 138/42, 44

See application file for complete search history.

(56) References Cited

U.S. PATENT DOCUMENTS 5,275,730 A * 1/1994 Keuschnigg ............ 210/512.1

FOREIGN PATENT DOCUMENTS

| | | |
|---|---|---|
| AT | 13 036 | 4/1903 |
| EP | 398864 A2 * | 11/1990 |
| GB | 245 636 | 1/1926 |
| WO | WO 92/10300 | 6/1992 |

* cited by examiner

*Primary Examiner*—David A Reifsnyder
(74) *Attorney, Agent, or Firm*—Young & Thompson

(57) ABSTRACT

A guide means of a centrifugal force separator or cyclone separator for separating at least one substance from a gaseous or liquid medium under the action of centrifugal forces has two or more baffle plates (2) with a radius which decreases from the center axis of the guide means, viewed in the direction of rotation of the medium. Between these baffle plates (2) entry openings (16) into the guide means are formed for the medium from which the substance has been largely removed into the guide means. There is a bottom plate (3) on the end of the guide means which projects into the interior of the device. To improve incident flow or inflow of the medium into the guide means, the bottom plate (3) in the area of the entry openings (16) has recesses (12).

12 Claims, 1 Drawing Sheet

GUIDE MEANS FOR CENTRIFUGAL FORCE SEPARATORS, ESPECIALLY CYCLONE SEPARATORS

BACKGROUND OF THE INVENTION

1. Field of the Invention

Figure 2:
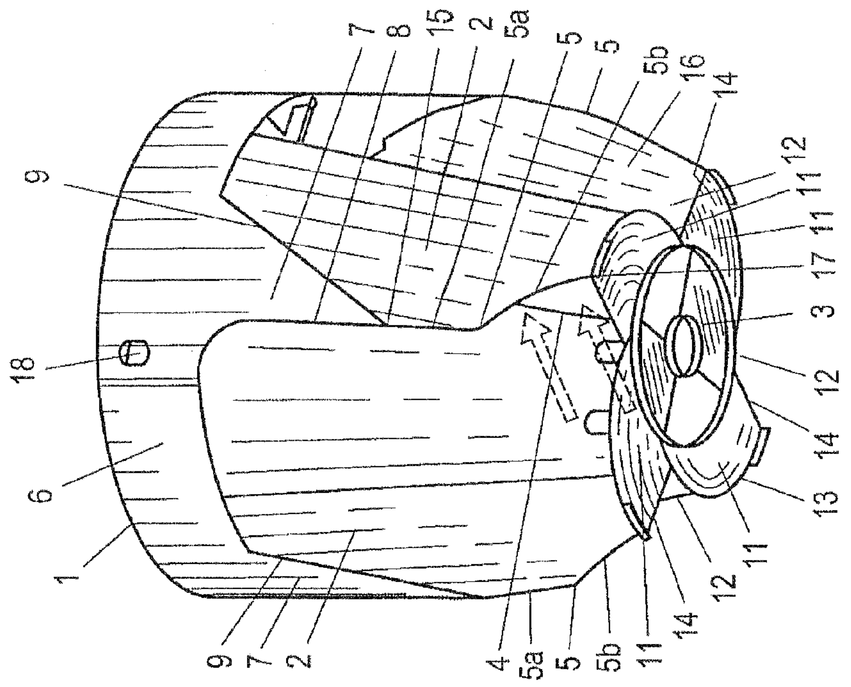

The invention relates to a guide means of a device, especially of a centrifugal force separator or cyclone separator, for separating at least one substance from a gaseous or liquid medium under the action of centrifugal forces, the substance having a higher specific weight than the medium, the guide means having at least one curved baffle plate with a radius which decreases from the center axis of the guide means, viewed in the direction of rotation of the medium, with at least one entry opening into the guide means for the medium from which the substance has been largely removed, and with a bottom plate on the end of the guide means which projects into the interior of the device.

The invention furthermore relates to an immersion pipe of a device, especially of a centrifugal force separator or cyclone separator, for separating at least one substance from a gaseous or liquid medium under the action of centrifugal forces, the substance having a higher specific weight that the medium.

The invention finally relates to a device, especially a centrifugal force separator or cyclone separator for separating at least one substance from a gaseous or liquid medium under the action of centrifugal forces, the substance having a higher specific weight that the medium, with a housing, with a means for producing rotary motion of the mixture of the substance and the medium in a separating chamber and with a guide means by which the substance is for the most part removed from the medium and then the medium is discharged from the separating chamber.

2. Description of the Related Art

These means (centrifugal force separators or cyclone separators) are known from WO 92/10300 A1. In particular WO 92/10300 A1 discloses placing at the end of the guide means a bottom plate which prevents the medium from entering the guide means on the end side. On the other side this bottom plate however prevents undisrupted incident flow onto the guide means or inflow of the medium into the guide means in the form of a helical flow in the region of the outer periphery of the bottom plate, so that the known guide means does not work quite satisfactorily.

BRIEF SUMMARY OF THE INVENTION

Therefore the object of the invention is to improve the known guide means in this respect.

This object is achieved with a guide means.

In the invention there is a bottom plate only in that area in which incident flow or inflow into the guide means is undesirable, conversely the bottom plate in the area of the entry opening has a recess so that the flow of the medium in this area is not hindered.

In the invention there can be two or more baffle plates and a corresponding number of recesses in the bottom plate which are located in the area of the entry openings which are formed between two adjacent baffle plates at a time. The number of baffle plates depends on the desired output of the device and on the type or composition of the substance and medium and the desired purity of the purified medium.

One preferred embodiment of the invention is characterized in that one segment of the contour of the recess in the bottom plate is formed by the entry edge which is parallel to the following baffle plate. The contour of the recess therefore in this region follows the shape of the baffle plate by which the flow of the medium here is not hindered by the bottom plate.

In one advantageous development of the invention, it is characterized in that one segment of the contour of the recess in the bottom plate is formed by the bottom edge which runs from the incident flow edge of the baffle plate to the interior of a distributor. With this bottom plate it can be determined how far the recess in the area of the entry opening extends in the direction of rotation of the medium.

The edge which runs from the incident flow edge of the baffle plate to the interior of a distributor can be essentially straight in one embodiment of the invention.

The recess in the bottom plate improves the incident flow and inflow of the medium since the medium upon entry into the guide means has not only one flow component in the peripheral or rotational direction, but also in the axial direction.

In order to further improve the incident flow behavior, in one preferred embodiment of the invention it can be provided that the incident flow edge of the baffle plate runs tilted at least in the segment adjacent to the bottom plate in the direction of rotation of the medium. The incident flow edge can thus be given an alignment which is roughly at a right angle to the flow direction of the medium.

When the edge of the recess which runs to the inside leads away from the incident flow edge of the baffle plate, overall an enlarged entry opening for the medium into the guide means is formed which improves the axial and tangential entry of the medium and thus leads to lower output losses of the cyclone separator.

In general, guide means such as the guide means as claimed in the invention are located on an immersion pipe which projects into a separation device in which the substance is separated from a gaseous or liquid medium.

In the invention, therefore the initially mentioned generic immersion pipe is characterized in that on the end of the immersion pipe which projects into the interior of the device there is a guide means.

The object as claimed in the invention is finally achieved with a generic device which is characterized in that it has a guide means.

Other preferred embodiments of the invention are the subject matter of the other dependent claims.

BRIEF DESCRIPTION OF THE DRAWING FIGURES

One preferred embodiment of the invention is described below with reference to the attached drawings.

Figure 1:
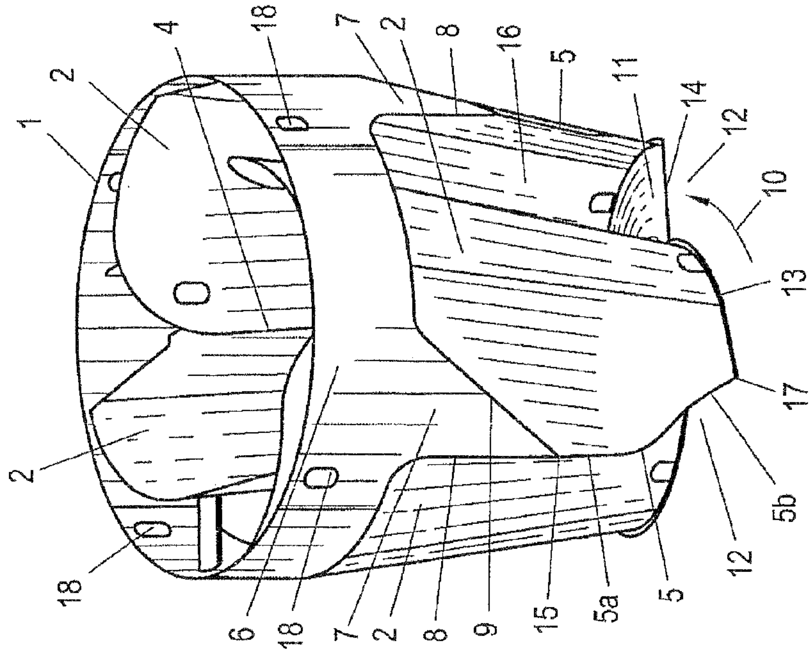

FIG. 1 shows a perspective view of one embodiment of the guide means as claimed in the invention and FIG. 2 shows a perspective view of the guide means from another angle.

DETAILED DESCRIPTION OF THE PREFERRED EMBODIMENTS

FIGS. 1 and 2 show a guide means which consists essentially of a cylindrical wall 1 in the upper area, four baffle plates 2 and one bottom plate 3. The four baffle plates 2 are all made the same and have a partially conical shape. This means that their radius of curvature in the area of the bottom plate 3 is less than in the opposing area near the cylindrical wall 1 and that they extend by an angle of roughly 100° to 110°. The axis of curvature of each baffle plate 2 is parallel to the center axis of the guide means which corresponds to the axis of the cylindrical wall 1.

The lengthwise edge 4 of the baffle plates 2 which is located within the guide means lies essentially in the plane of the axis of curvature of the respective baffle plate 2. The outside incident flow edge 5 which is opposite the lengthwise edge 4 in the embodiment shown in the drawings does not run in a straight line, but bent. The upper segment 5*a* which is adjacent to the cylindrical wall 1 is aligned essentially parallel to the axis of curvature, conversely the lower segment 5*b* which is adjacent to the bottom plate 3 is tilted in the direction of rotation of the medium and is aligned at an angle of roughly 90° to the flow direction of the medium. The direction of rotation of the medium is shown in FIG. 1 by the arrow 10.

The cylindrical wall 1 consists of a cylindrical ring 6 and four pointed shoulders 7 which are adjoined by the baffle plates 2. The front edge 8 of these shoulders 7 forms a prolongation of the incident flow edge 5*a* of the baffle plates 2. The rear edge 9 of the shoulder 7 adjoin the baffle plates 2. It is apparent that the baffle plates 2 in the connection area 9 to the shoulders 7 of the cylinder jacket-shaped wall 1 are not curved, since the connection can be produced technically more easily in this way. Therefore in fact only the region of the baffle plates 2 which lies behind in the direction 10 of rotation is curved in a conical shape.

The bottom plate 3 to a certain extent appears propeller-like, there being recesses 12 between the blades 11. The blades 11 and the recesses 12 are bordered by the entry edge 13 and the bottom edge 14. The entry edge 13 has a curved shape which corresponds to the following edge of the baffle plates 2. The bottom edge 14 is straight and leads from the lower corner 17 of the following incident flow edge 5*b* to the inside.

Instead of a bent incident flow edge 5 on the baffle plates 2 an incident flow edge could also be used which continues straight in an extension of the incident flow edge 9 on the cylindrical wall 1. But for example an incident flow edge on the baffle plates 2 would be conceivable and more advantageous which runs without noteworthy curvature directly from the tip 15 of the shoulders 7 in the flow direction 10 tilted to the corner 17 on the bottom plate 3.

The entry opening 16 which is formed between the adjacent baffle plates 2 can be exposed to incident flow not only tangentially through the recesses 12 in the bottom plate 3, but also with an axial component through the recesses 12 in the bottom plate; this is beneficial in terms of flow engineering. The incident flow behavior can be additionally benefitted by the additional tilt of the incident flow edge 5*b* roughly at a right angle to the flow direction.

The guide means as claimed in the invention, as is conventional in the prior art, can be attached to an immersion pipe which is not shown in the drawings, for which the openings 18 in the cylindrical wall 1 are used. The guide means is furthermore installed in a centrifugal force separator or cyclone separator with a housing which has a means for producing rotary motion of the mixture of the substance and medium, and a separating chamber into which the guide means projects. The medium from which the substance has for the most part been removed is then withdrawn from the separating chamber by the guide means and flows axially out of the guide means. Since these devices have been known for a long time in the prior art, for example EP-A-398 864, they are not detailed in this application.

The invention claimed is:

1. A guide means of a device for separating at least one substance from a gaseous or liquid medium under the action of centrifugal forces, the substance having a higher specific weight than the medium, the guide means comprising:

at least one curved baffle plate (2) with a radius which decreases from a center axis of the guide means, viewed in a direction of rotation of the medium, with an entry opening (16) into the guide means for the medium from which the substance has been largely removed, and with a bottom plate (3) on an end of the guide means which projects into an interior of the device, wherein the bottom plate (3) in an area of the entry opening (16) has a recess (12).

2. The guide means as claimed in claim 1, wherein there are two or more baffle plates (2) and a corresponding number of recesses (12) in the bottom plate (3) which are located in the area of the entry opening (16) which are formed between two adjacent baffle plates (2).

3. The guide means as claimed in claim 1, wherein one segment of a contour of the recess (12) in the bottom plate (3) is formed by the entry edge (13) which is parallel to a following baffle plate (2).

4. The guide means as claimed in claim 1, wherein one segment of a contour of the recess (12) in the bottom plate (3) is formed by a bottom edge (14) which runs from an incident flow edge (5) of the baffle plate (2) to the interior of a distributor.

5. The guide means as claimed in claim 4, wherein the bottom edge (14) which runs from a corner (17) of the incident flow edge (5) of the baffle plate (2) to the interior of a distributor, which corner (17) adjoins the bottom plate (3), is essentially straight.

6. The guide means as claimed in claim 1, wherein the incident flow edge (5) of the baffle plate (2) runs tilted in a segment (5*b*) adjacent to the bottom plate (3) in a direction of rotation of the medium.

7. The guide means as claimed in claim 6, wherein the incident flow edge (5) is bent.

8. The guide means as claimed in claim 6, wherein the incident flow edge (5) is essentially straight.

9. The guide means as claimed in claim 1, wherein the baffle plate (2) is curved essentially in a shape of a partial cone, or of a partial frustum of a cone, an axis of curvature of the baffle plate (2) running parallel to the center axis of the guide means.

10. The guide means as claimed in claim 9, wherein the guide means further comprises a cylinder jacket-shaped wall (1, 7) adjoined by a segment of the baffle plate (2).

11. The guide means as claimed in claim 10, wherein a portion of an incident flow edge (5, 5*a*) of the baffle plate (2) adjoins an incident flow edge (8) of the cylinder jacket-shaped wall (1, 7).

12. The guide means as claimed in claim 1, wherein the guide means is adapted for a centrifugal force separator or cyclone separator.

* * * * *